(12) United States Patent
Vorbach

(10) Patent No.: US 9,322,479 B2
(45) Date of Patent: Apr. 26, 2016

(54) INJECTION VALVE HAVING A FLOW LIMITER

(75) Inventor: Marco Vorbach, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/982,057

(22) PCT Filed: Jan. 17, 2012

(86) PCT No.: PCT/EP2012/050601
§ 371 (c)(1),
(2), (4) Date: Oct. 7, 2013

(87) PCT Pub. No.: WO2012/101000
PCT Pub. Date: Aug. 2, 2012

(65) Prior Publication Data
US 2014/0034859 A1    Feb. 6, 2014

(30) Foreign Application Priority Data

Jan. 26, 2011    (DE) .......................... 10 2011 003 163

(51) Int. Cl.
*F16K 1/42* (2006.01)
*F02M 61/08* (2006.01)
*F02M 61/18* (2006.01)
*F16K 1/38* (2006.01)

(52) U.S. Cl.
CPC ................. *F16K 1/42* (2013.01); *F02M 61/08* (2013.01); *F02M 61/18* (2013.01); *F16K 1/385* (2013.01)

(58) Field of Classification Search
CPC .......... F16K 1/42; F16K 1/385; F02M 61/18; F02M 61/08
USPC ......... 251/118, 119, 120, 122, 123, 127, 903; 239/533.2, 541
See application file for complete search history.

(56) References Cited

U.S. PATENT DOCUMENTS

| 2,753,217 | A  | * | 7/1956 | Pecora, Jr. et al. ............ 239/453 |
| 5,758,829 | A  | * | 6/1998 | Itoh et al. ................... 239/533.2 |
| 6,260,776 | B1 | * | 7/2001 | Popp .......................... 239/533.6 |
| 6,585,171 | B1 | * | 7/2003 | Boecking ................... 239/102.1 |
| 7,090,151 | B2 | * | 8/2006 | Potschin et al. ............ 239/533.2 |
| 7,712,684 | B2 | * | 5/2010 | Masuda et al. ........... 239/533.12 |
| 2004/0004139 | A1 | * | 1/2004 | Fischer et al. ................ 239/584 |
| 2007/0176132 | A1 | * | 8/2007 | Grandi .......................... 251/120 |

FOREIGN PATENT DOCUMENTS

| DE | 475166     | 4/1929 |
| DE | 19843570   | 3/2000 |
| DE | 10306959   | 9/2004 |
| JP | 59-147861  | 8/1984 |
| JP | 2002-525485| 8/2002 |

* cited by examiner

*Primary Examiner* — Matthew W Jellett
(74) *Attorney, Agent, or Firm* — Kenyon & Kenyon LLP

(57) ABSTRACT

A valve for injecting fuel includes a valve carrier having a valve seat and an inflow orifice, a valve positioning member, and a flow limiting element that is disposed on the valve positioning member. The inflow orifice includes a step having a peripheral annular edge, and the flow limiting element is disposed on the valve positioning member in such a way that when the valve is opened, a flow area between the annular edge and the flow limiting element is reduced from a first flow area to a second flow area.

4 Claims, 5 Drawing Sheets

INJECTION VALVE HAVING A FLOW LIMITER

FIELD OF THE INVENTION

The present invention relates to an injection valve for injecting fuel, having a flow limiting element.

BACKGROUND INFORMATION

Injection valves that are embodied as multi-orifice valves having a magnetic drive, or as an outward-opening injection valve having a piezo drive, are known from the existing art. Whereas on the one hand the magnetically driven injection valves can be manufactured relatively economically, the piezo injection valves are substantially more robust with regard to carbon deposition because of the outward-opening valve positioning members. In magnetic injection valves a stop that minimizes variation in a fuel flow in the new condition is often provided. In addition, there must be no negative effects on vehicle operation due to the influence of inflow effects of the stop. On the other hand, with outward-opening valves the stop surfaces of the magnet armature can change with increasing wear, so that a needle stroke length can increase over time. This results in an increase in the flow volume, however, which can bring about a change in application.

SUMMARY

The injection valve according to the present invention for injecting fuel has, in contrast, the advantage that a flow volume can be kept constant over the service life of the valve. Two throttling points for the fuel path are moreover produced when the valve is open, specifically at a valve positioning member lifted from the valve seat and at a flow limiting element. Even if increased wear on components, which would lead to an increase in needle stroke length, occurs during the utilization period of the injection valve, it is thus possible according to the present invention, as a result of the disposition of the flow limiting element on the valve positioning member, to provide compensation by reducing a flow cross section between the flow limiting element and a step provided in an inflow orifice. The valve according to the present invention has a very simple and economical design.

Particularly preferably, the valve is an outward-opening injection valve. The result is that, in particular, a risk of carbon deposition on the valve can be appreciably reduced, and compensation for wear can nevertheless be ensured by way of the flow limiting element according to the present invention.

Particularly good compensation for wear is achieved if the flow limiting element has a surface that tapers in the flow direction and defines, with the step in the inflow orifice, the size of the flow area as a function of a position of the valve positioning member. The tapering surface can thereby be selected in accordance with the wear that is occurring, thus resulting in exact compensation for wear, in particular in the context of a solenoid valve.

Particularly preferably, the tapering surface of the flow limiting element is a conical surface. This can be manufactured very simply and cost-effectively. In addition, it is thereby possible in particular to compensate for a substantially constant wear by way of the flow limiting element.

According to a preferred alternative embodiment, the tapering surface is of convex or concave embodiment. This makes it possible to take into account, depending on the application, wear that increases differently over the service life.

According to another preferred embodiment of the invention, the tapering surface is constituted with a step between two tapering partial surfaces. The two tapering partial surfaces are preferably both conical surfaces, particularly preferably each having a different slope. This configuration of the flow limiting element also makes it possible, in particular, to establish a flow volume in terms of a length of a valve stroke, for example in a context of multiple injections per injection cycle. Also preferably, the two tapering partial surfaces are of equal length in an axial direction.

In order to obtain the best possible flow guidance when the valve is open, a flow region having a constant diameter is preferably constituted in the inflow orifice between the step in the inflow orifice and the valve seat in the flow direction.

The valve according to the present invention is preferably a solenoid valve. Be it noted, however, that the valve according to the present invention can in principle also be utilized in the context of a piezo valve.

DETAILED DESCRIPTION

An injection valve 1 according to a first preferred exemplifying embodiment will be described in detail below with reference to FIGS. 1 and 2.

Figure 1:
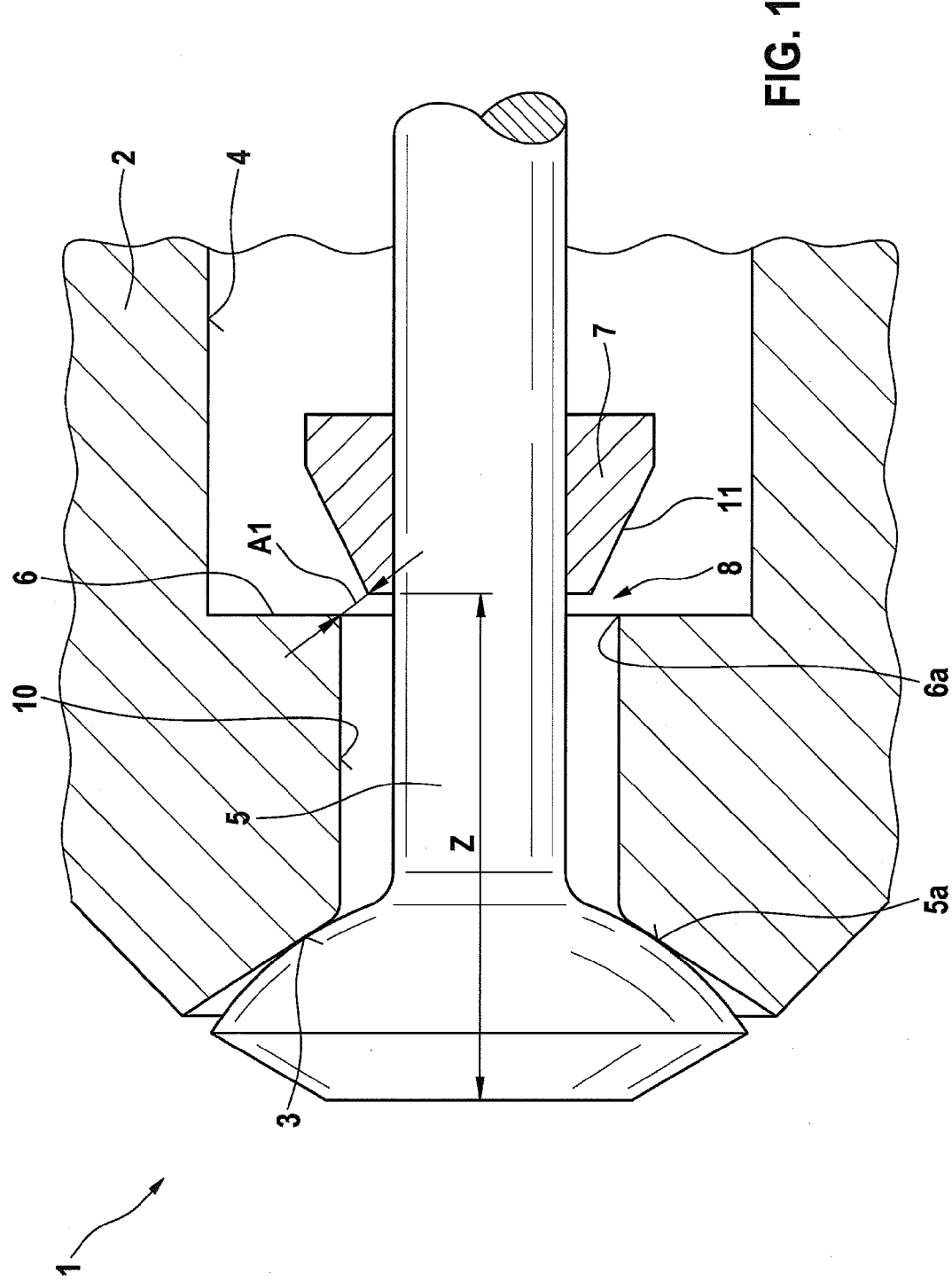
FIG. 1 is a schematic sectioned view of an injection valve according to a first exemplifying embodiment, in a closed state.
Figure 2:
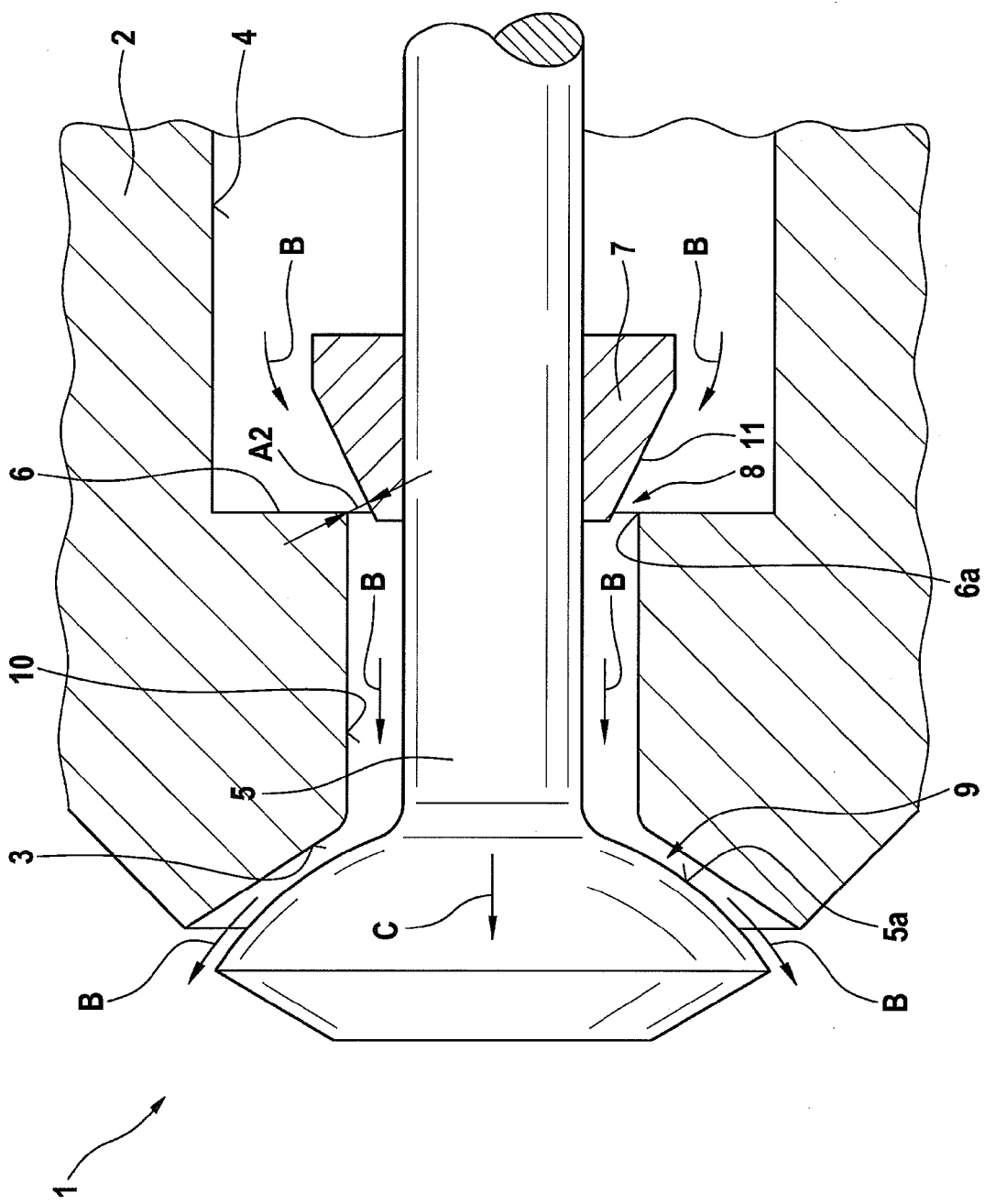
FIG. 2 is a schematic sectioned view of the injection valve according to FIG. 1, in an opened state.

As is evident from FIG. 1, injection valve 1 encompasses a valve carrier 2 on which a step-shaped inflow orifice 4 is provided. Inflow orifice 4 encompasses a step 6 as well as a flow region 10 of constant diameter located between step 6 and a valve seat 3 in the flow direction (see FIG. 2, arrow B). A valve needle constituting a valve positioning member 5 seals against valve seat 3 in known fashion. As is further evident from FIG. 1, a flow limiting element 7 is mounted on the valve needle. As is evident from the closed state of the injection valve shown in FIG. 1, an annular flow area A1 is defined, between flow limiting element 7 and an annularly peripheral annular edge 6a of step 6, at a flow gap 8. Flow limiting element 7 has a region 11 tapering conically in flow direction B.

As is evident from FIG. 1, this results in a constant distance Z from flow limiting element 7 to an end point, located farthest away in the combustion chamber, of valve positioning member 5. This distance Z is not changed by any wear that may exist during operation of the injection valve. When valve positioning member 5 is moved in the direction of arrow C, as is evident from FIG. 2, and opens the injection valve, fuel (arrow B) flows through the throttling point between conical region 11 of flow limiting element 7 and annular edge 6a of step 6, and past the open valve seat 3; a second throttling point (needle annular gap 9) is present between a spherical-segment-shaped region 5a of the valve needle and valve seat 3. As is immediately apparent from FIG. 2, a size of the flow area at flow gap 8 has decreased from A1 to A2. If an increasing needle stroke length then occurs over time, for example because of wear on the valve actuator, the flow area A2 present when the injection valve is opened becomes increasingly smaller because of the conical configuration of flow limiting element 7. In other words, a decreased pressure drop at the needle annular gap between valve seat 3 and the spherical-segment region of the valve needle is compensated for by a greater pressure drop at flow limiting element 7. Depending on the selection of an angle of conical region 11, it is possible in this context to model any characteristic curve that permits a constant injection volume over the entire service life of the injection valve.

It is thus possible according to the present invention to implement an outward-opening valve that is preferably embodied as a solenoid valve. As a result, a stop can, in particular, also be provided for the solenoid valve, such that despite the wear-related change in the stroke length of the valve needle, the solenoid valve can ensure compensation via the flow limiting valve 7, for a constant injection duration over the service life of the solenoid valve. The result is that a wear-related increase in an area at needle annular gap 9 can be compensated for by a reduction in the area at flow limiting element 7. Flow limiting element 7 can be of very simple construction, and demarcates the area in coaction with a step 6, likewise easy to manufacture, in inflow orifice 4. A flow region 10, disposed after step 6 in flow direction B and having a constant diameter, ensures flow calming of the fuel flow before emergence from the injection valve.

Figure 3:
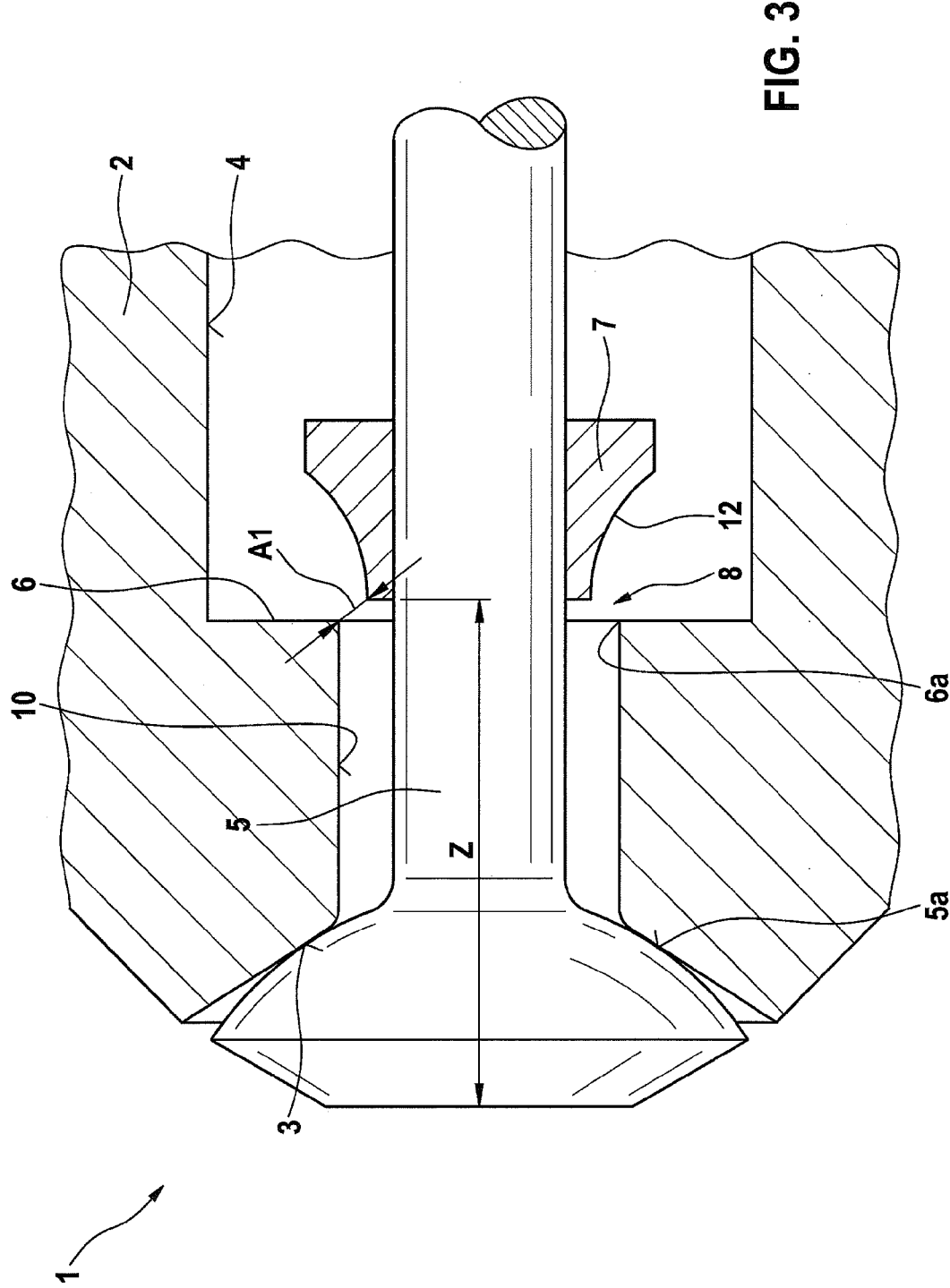
FIG. 3 is a schematic sectioned view of an injection valve according to a second exemplifying embodiment, in a closed state.
Figure 4:
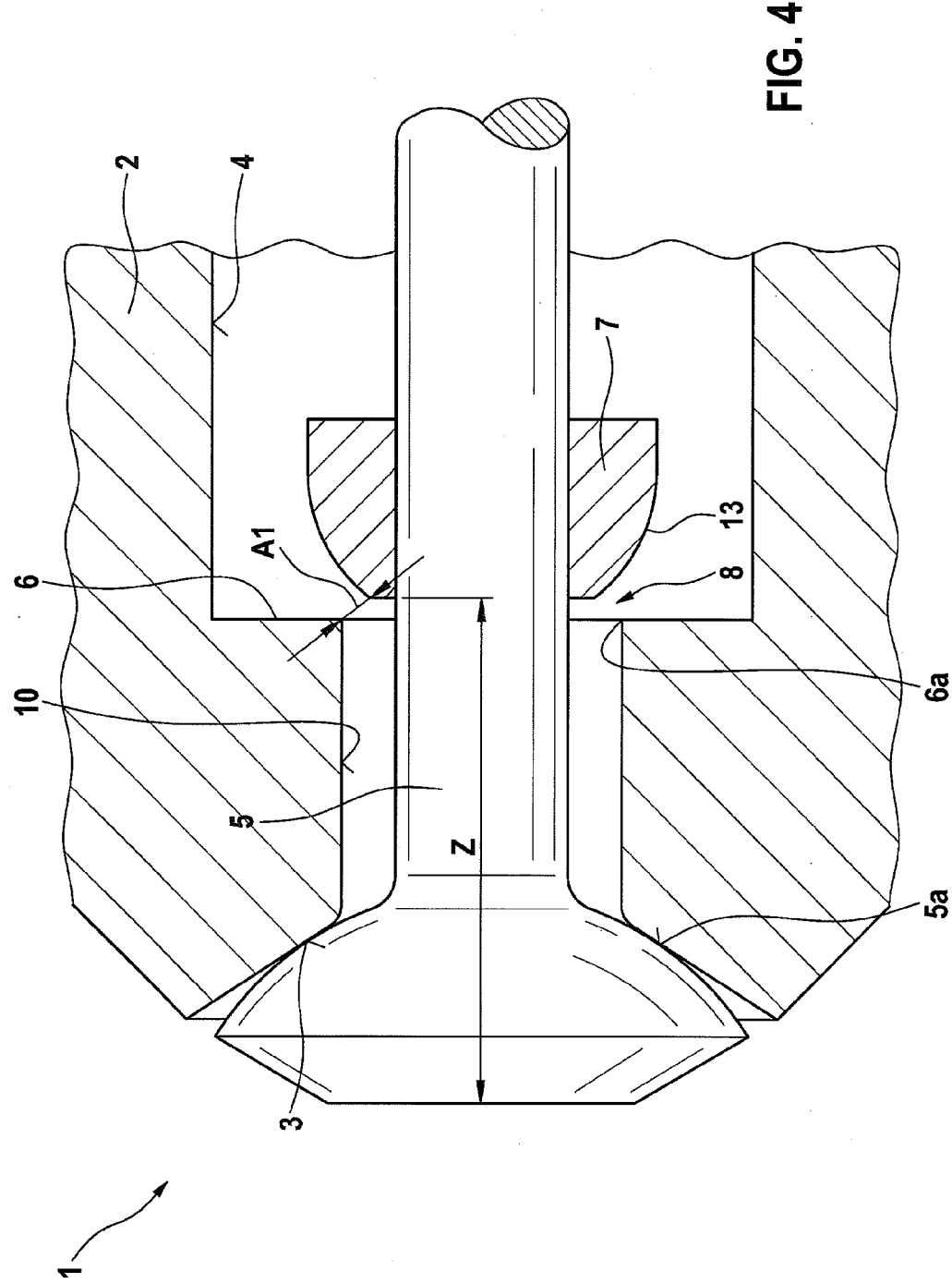
FIG. 4 is a schematic sectioned view of an injection valve according to a third exemplifying embodiment, in a closed state.
Figure 5:
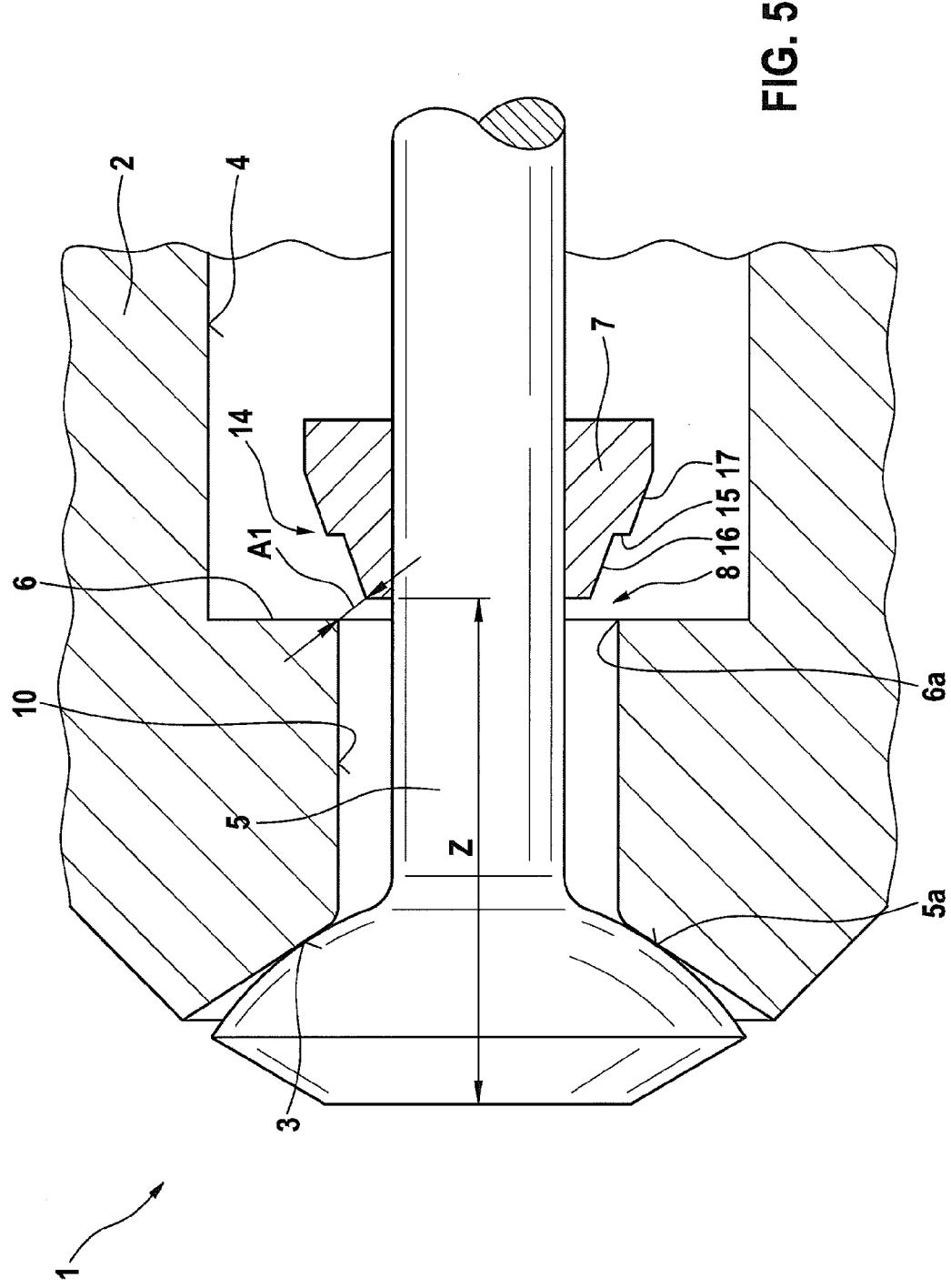
FIG. 5 is a schematic sectioned view of an injection valve according to a fourth exemplifying embodiment, in a closed state.

FIGS. 3 to 5 show alternative embodiments of the invention, identical or functionally identical parts being labeled with the same reference characters as in the first exemplifying embodiment.

FIG. 3 shows a flow limiting element 7 having a concave region 12 that, together with step 6, demarcates flow area A1. Depending on the configuration of concave region 12, flow area A1 becomes reduced to a greater degree in the context of an increase in valve pressure. A converse change in the annular flow area A1 is present in FIG. 4, which has a convex region 13 at flow limiting element 7 that, with step 6, defines flow area A1. In the fourth exemplifying embodiment shown in FIG. 5, a step-shaped region 14 is embodied on flow limiting element 7, which has a step 15, a first conical region 16, and a second conical region 17. Step 15 is disposed here between the first and second conical regions 16, 17. Conical regions 16, 17 can have the same slope or, alternatively, also a different slope. With this embodiment of flow limiting element 7 it is possible in particular to adjust a flow volume in a context of partial strokes of valve positioning member 5.

What is claimed is:
1. A valve for injecting fuel, comprising:
    a valve carrier having a valve seat and an inflow orifice, the inflow orifice having a step that includes a peripheral annular edge;
    a valve positioning member including a stem and a valve head, the valve head having (a) a convex valve head surface opposed to the valve seat, and (b) a downstream end point; and
    a flow limiting element;
    wherein the flow limiting element:
        is a discrete component that is mounted on the stem of the valve positioning member at a predefined distance from the downstream end point in such a way that:
        the predefined distance remains constant;
        when the valve positioning member is opened, a flow area between the annular edge and the flow limiting element is reduced from a first flow area to a second nonzero flow area; and
        the flow area is nonzero during a full range of movement of the valve positioning member; and
    has a tapering region that tapers in a flow direction and defines, with the peripheral annular edge, a size of the second flow area as a function of a position of the valve positioning member, the tapering region being a step-shaped region that includes a step, a conically embodied and tapering first partial region, and a conically embodied and tapering second partial region.
2. The valve as recited in claim 1, wherein the valve is an outward-opening valve.
3. The valve as recited in claim 1, further comprising:
    a flow region having a constant diameter that is disposed between the step and the valve seat in the flow direction.
4. The valve as recited in claim 1, wherein the valve is a solenoid valve.

* * * * *